(12) United States Patent
Kuhn et al.

(10) Patent No.: US 9,030,657 B2
(45) Date of Patent: May 12, 2015

(54) DEVICE AND METHOD FOR SUBAPERTURE STRAY LIGHT DETECTION AND DIAGNOSIS

(71) Applicants: William P. Kuhn, Tucson, AZ (US);
John C. Stover, Tucson, AZ (US);
Robert S. LeCompte, Tucson, AZ (US)

(72) Inventors: William P. Kuhn, Tucson, AZ (US);
John C. Stover, Tucson, AZ (US);
Robert S. LeCompte, Tucson, AZ (US)

(73) Assignee: William P. Kuhn, Ph.D., LLC, Tucson, AZ (US)

( * ) Notice: Subject to any disclaimer, the term of this patent is extended or adjusted under 35 U.S.C. 154(b) by 0 days.

(21) Appl. No.: 13/726,154

(22) Filed: Dec. 23, 2012

(65) Prior Publication Data

US 2013/0258323 A1     Oct. 3, 2013

Related U.S. Application Data

(63) Continuation-in-part of application No. 12/836,457, filed on Jul. 14, 2010, now abandoned.

(51) Int. Cl.
| | |
|---|---|
| *G01N 21/00* | (2006.01) |
| *G01B 9/00* | (2006.01) |
| *G01B 11/26* | (2006.01) |
| *G01J 1/00* | (2006.01) |

(52) U.S. Cl.
CPC .. *G01B 11/26* (2013.01); *G01J 1/00* (2013.01)

(58) Field of Classification Search
CPC ............... G01N 2201/064; G01N 2201/0642; G01B 11/26
USPC ................................................... 359/601–613
See application file for complete search history.

(56) References Cited

U.S. PATENT DOCUMENTS

| | | | | |
|---|---|---|---|---|
| 4,102,580 | A * | 7/1978 | Fletcher et al. | 356/446 |
| 7,673,991 | B2 * | 3/2010 | Van den Berg et al. | 351/221 |
| 7,697,124 | B2 * | 4/2010 | Huang et al. | 356/124 |
| 2003/0122058 | A1 * | 7/2003 | Lin et al. | 250/214 B |
| 2005/0002104 | A1 * | 1/2005 | Holmgren et al. | 359/618 |

OTHER PUBLICATIONS

Photon Engineering FRED, http://www.photonengr.com/fred/straylght.html.*
Peterson, Gary L.; Proc. of SPIE vol. 7069, 70690M, (2008).*
ASAP Procedural Note, BRO-PN-1157(Oct. 2001).*
Fleming, John et al.; Proc. of SPIE vol. 7069, 70690O, (2008).*

* cited by examiner

*Primary Examiner* — Tarifur Chowdhury
*Assistant Examiner* — Hina F Ayub
(74) *Attorney, Agent, or Firm* — William A. Birdwell

(57) ABSTRACT

A device and method for subaperture stray light detection and diagnosis. A test light beam is generated. Stray light is detected. Based on the detected stray light, potential paths that light may have taken to arrive at the detection surface are determined. A testing device comprises a test light beam source whereby the cross sectional area of the test light beam is made less than the cross sectional area of the system aperture. A relative lateral positioning stage and an angular beam directing stage launch the test light beam into the aperture. A detector and a data processing system produce a data set relating the stray light to the location and directional angles of the test light beam to identify the sources of stray light. A light trap and test light beam delivery system are provided.

13 Claims, 11 Drawing Sheets

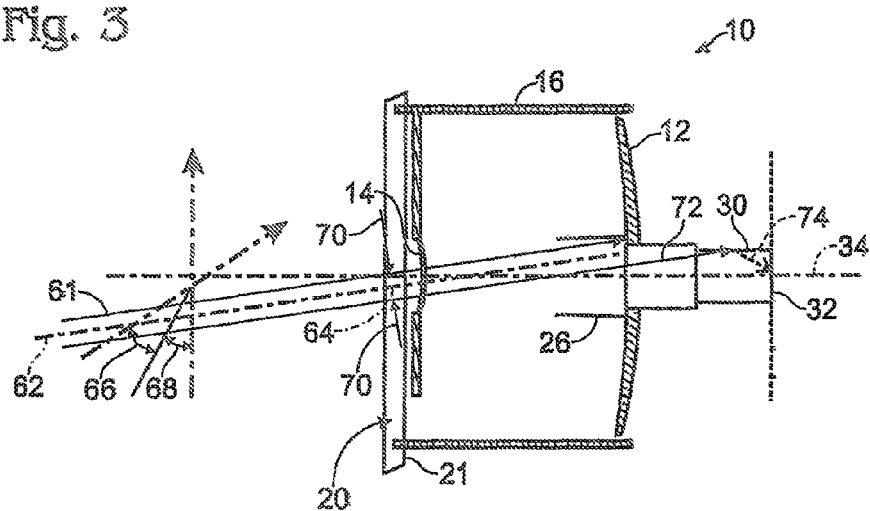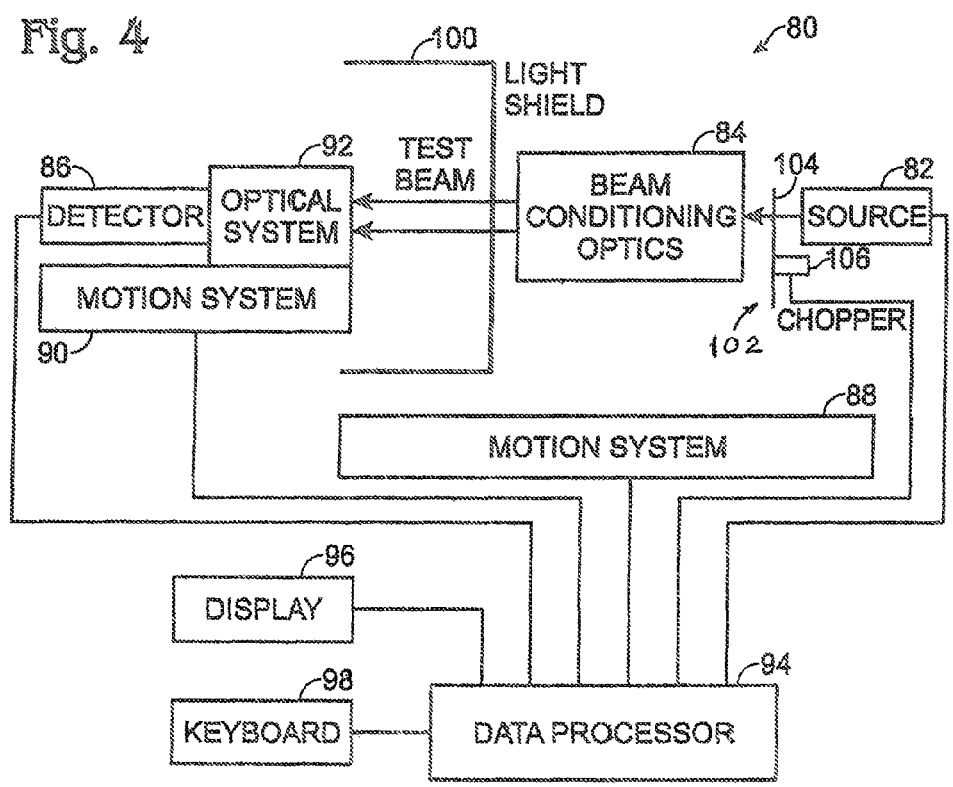

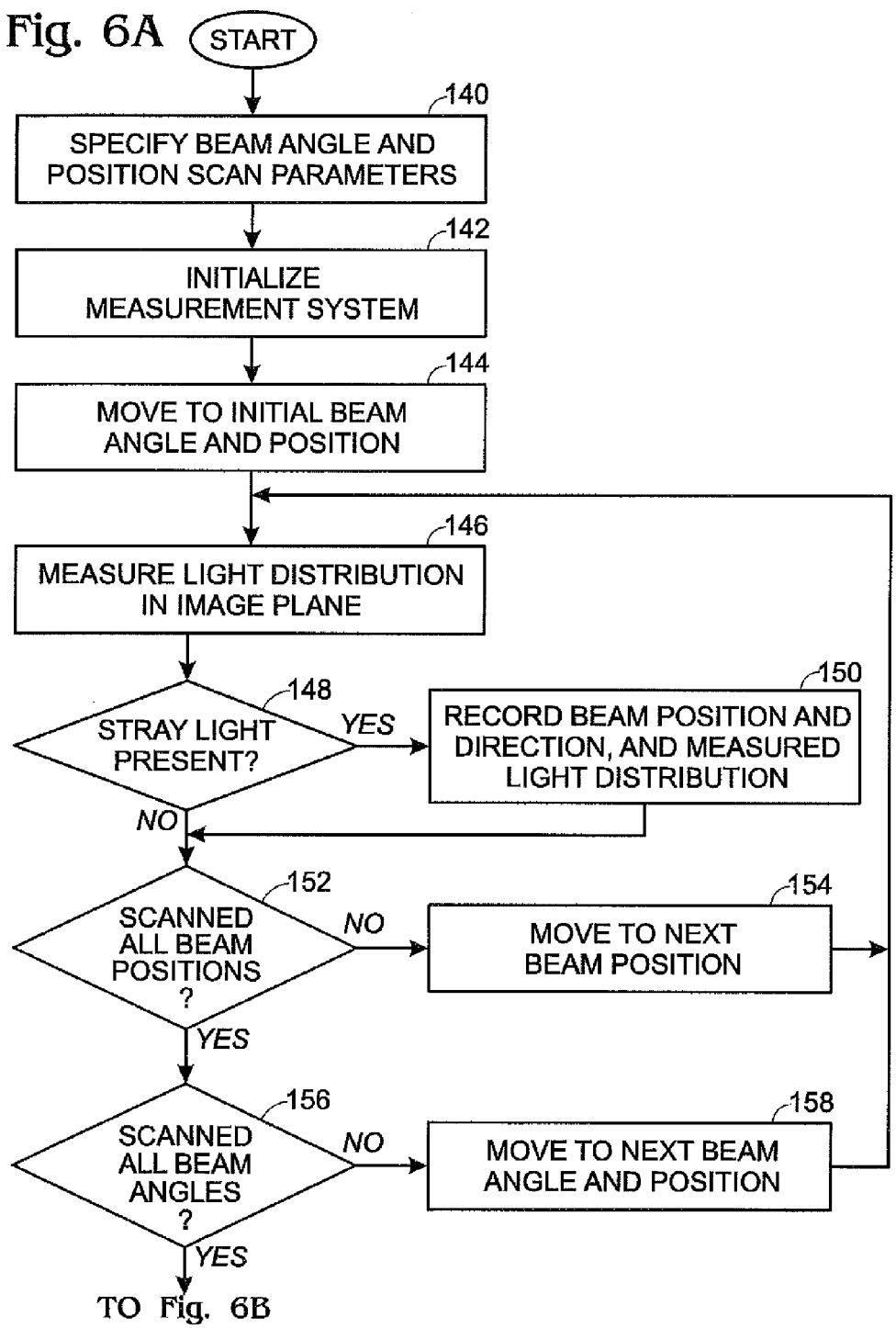

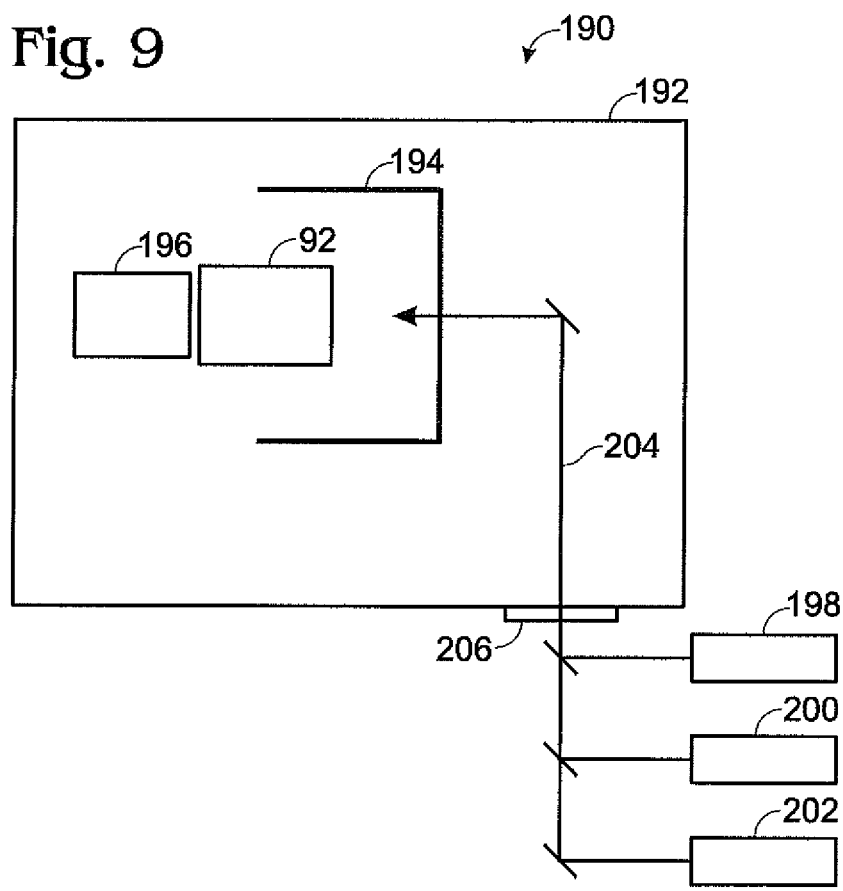

DEVICE AND METHOD FOR SUBAPERTURE STRAY LIGHT DETECTION AND DIAGNOSIS

RELATED APPLICATIONS

This application is a continuation-in-part of, and claims the benefit of priority of, U.S. patent application Ser. No. 12/836,457, filed Jul. 14, 2010, which is based on and claims the benefit of priority of U.S. Provisional Application No. 61/271,034, filed Jul. 16, 2009, both of which applications are hereby incorporated by reference in their entirety.

FEDERALLY SPONSORED RESEARCH AND DEVELOPMENT

Subject matter disclosed herein was developed under a contract with and agency of the United States Government, namely, the Missile Defense Agency, Contract No. HQ0006-09-C-7126. The Government has certain rights in this invention.

BACKGROUND OF THE INVENTION

1. Field of the Invention

This invention relates in general to the field of stray-light detection and diagnosis in optical systems and, in particular, to a novel device and method for stray-light detection and diagnosis by illumination of the aperture of an optical system with a subaperture light beam to facilitate tracing stray light to its source.

2. Discussion of Related Art

For an optical imaging system to produce a good image, the system must produce an acceptable wavefront quality over the field-of-view and maintain acceptable control of stray-light. This is generally true for any imaging system, regardless of the operating wavelength band. Stray light can obscure faint signals, decrease the signal-to-noise ratio, reduce image contrast, create inaccurate radiometric and photometric results and, in high energy laser systems, destroy optical elements and detectors. Stray light becomes a critical issue for optical systems that must look at a low-level signal on a bright background, such as in the case of long-wave infrared imaging systems.

Stray-light in a system can arise from multiple sources including design defects such as inadequate baffles, manufacturing problems such as damage to a coating or baffle edge, incorrect assembly and foreign object debris. Determining the cause of stray-light can be a very challenging problem. Much can be accomplished through analysis of a design via simulation, but simulation is not proof of a system's performance. Furthermore, simulation does not account for a system that does not conform to the design, which occurs for example due to component damage, incorrect assembly, or foreign object debris.

Historically, stray-light problems are resolved through design and build methods that depend heavily upon analysis or are ad hoc. In either case, the detection, diagnosis and mitigation of a stray light problem is very time consuming. Stray-light testing in these scenarios uses full aperture illumination, such as in the stray-light test station of Breault Research Organization, described in G. L. Peterson, "Stray light test station for measuring point source transmission and thermal background of visible and infrared sensors," Proc. of SPIE Vol. 7069, 70690M (2008). In this test station full-aperture illumination is used to detect the presence of stray-light in an optical system from illumination at a particular direction, e.g., field and azimuth angles, relative to the system under test.

Determination of the cause of the stray light produced by full-aperture illumination requires extensive analysis of a minimal data set comprised of the knowledge that stray light occurs when light comes from a specific direction. This data is used, in combination with analysis, to hypothesize where the stray light originates; however, proof requires corrective action to the system (disassembly, modification and reassembly) and repetition of the test to demonstrate the stray-light is no longer present.

What is needed is a more efficient means to determine the specific cause of stray light in a system for system design evaluation, system production and testing of systems in the field.

BRIEF SUMMARY OF THE INVENTION

A method is disclosed for identifying actual sources of stray light in an optical system having an aperture through which light may enter the system and a detection surface. In a principal respect, the method comprises generating a test light beam having a propagation axis and a selected width at a selected location along the propagation axis of the beam; and launching the beam into the optical system at a selected lateral position in the aperture and at selected directional angles relative to a selected optical axis, the width of the beam at the aperture being selected so that the cross sectional area of the beam is less than the cross sectional area of the aperture. It further comprises detecting the presence of stray light at the detection surface, and based on the presence of stray light at the detection surface and the location and direction angles of the test light beam, tracing potential paths that light from the test light beam may have taken to arrive at the detection surface so as to identify physical features of the optical system that may have produced unwanted stray light at the detection surface.

A device is disclosed for identifying sources of stray light in an optical system to be tested having an aperture through which light may enter the system and a detection surface. In a principal respect, the device comprises a source of a test light beam having a propagation axis and a selected width at a selected location along the propagation axis of the test light beam, including a test light beam width magnifier whereby the cross sectional area of the test light beam may be made less than the cross sectional area of the aperture the optical system to be tested; a relative lateral positioning stage; and an angular test light beam directing stage, the lateral test light beam positioning stage and the angular test light beam directing stage be adapted to launch the test light beam into the aperture at a selected position and selected directional angles with respect to a selected optical axis. It further comprises a detector adapted to be located at the detection surface, and a data processing system responsive to the detector for identifying stray light that reaches the detector and producing a data set relating the presence of stray light at the detector to the location and direction angles of the test light beam at the aperture.

An instrument employing a device for identifying sources for stray light in an optical system according to the present invention may include a light trap at which the optical system looks and a complementary beam delivery system such that a portion of the beam delivery system that can be seen by the optical system under test acts in combination with the light trap to maintain the performance of the light trap.

It is to be understood that this summary is provided as a means of generally determining what follows in the drawings and detailed description, and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 3 is an illustration of the method according to the present invention for stray-light detection and diagnosis applied to a Cassegrain telescope illustrated from the side as in FIG. 1B.

FIG. 4 is a schematic diagram of an embodiment of a device for stray-light detection and diagnosis according to the present invention.

FIG. 6A is the first part of a flow chart showing steps for stray-light detection and diagnosis according to the present invention.

FIG. 9 is a schematic diagram of an alternative embodiment of a device for stray-light detection and diagnosis according to the present invention.

DETAILED DESCRIPTION OF THE PREFERRED EMBODIMENT

Figure 1A:
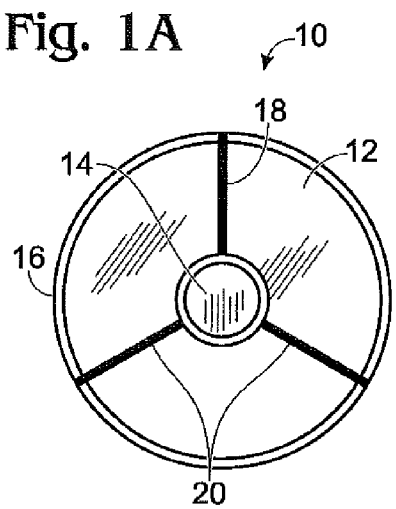
FIG. 1A is a front-view illustration of a two-mirror Cassegrain telescope used as an example of an optical system to be tested for stray light.
Figure 1B:
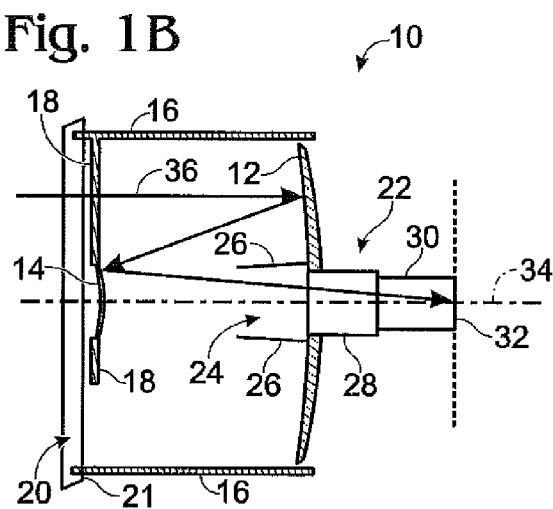
FIG. 1B is a side-view illustration of a two-mirror Cassegrain telescope used as an example of an optical system to be tested for stray light.

Referring first to FIG. 1A and FIG. 1B, an illustrative Cassegrain telescope 10 is shown as a vehicle for explaining the operation of embodiments of the invention herein. FIG. 1A is a front view of the Cassegrain telescope and FIG. 1B is a side-view of the Cassegrain telescope. The telescope comprises a primary mirror 12 and secondary mirror 14, a cylindrical baffle 16 in which the primary and secondary mirrors are disposed, struts 18 for suspending the secondary mirror 14 in the center of an entrance aperture 20 (the plane of which is symbolized by parallelogram 21), a detector assembly 22 disposed behind a detector aperture 24 in the primary mirror 12, and a Frustrum-shaped interior baffle 26 surrounding the detector aperture 24. The detector assembly 22 typically comprises a tubular third baffle 28 for accommodating the focal length of the telescope, a detector baffle 30, preferably having anti-reflective coating on the interior wall thereof, and an array detector 32 at the back of the detector baffle. An optical axis 34 for the telescope may be defined as that longitudinal axis about which the optical elements of the telescope are radially symmetric. Thus, for example, a light ray 36 entering from the left (as is convention) through the aperture 20, parallel to the optical axis 34, will be reflected off the primary mirror 12, then off the secondary mirror 14, and then to the array detector 32 at the optical axis 34 of the telescope. However, it is to be understood that the term "optical axis" as used herein with respect to an optical system under test may be any axis associated with the optical system under test that is selected as a suitable reference axis for the purpose of implementing the present invention.

Figure 2:
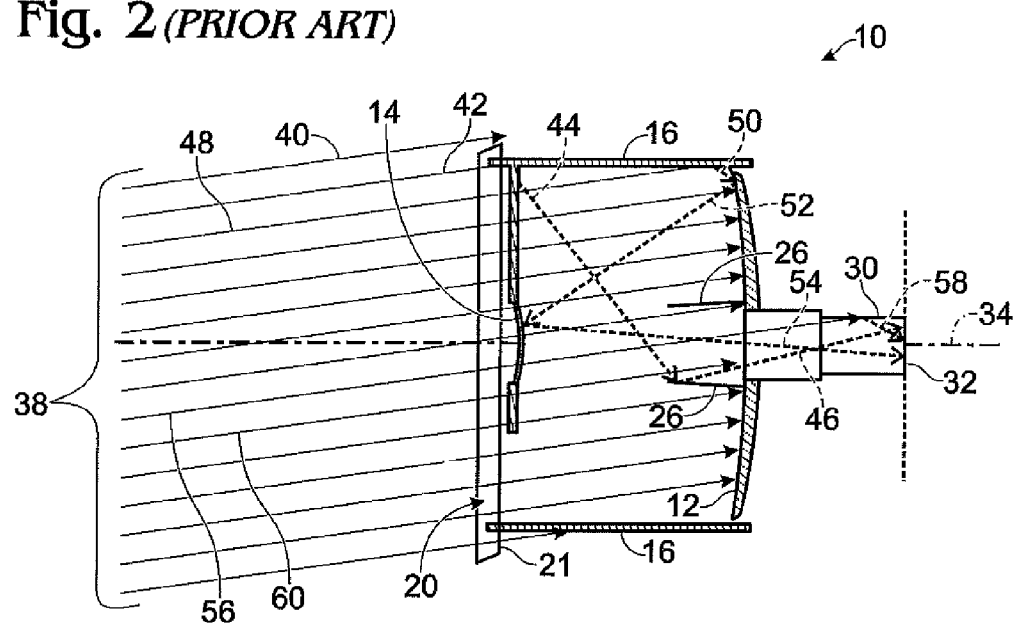
FIG. 2 is an illustration of a prior art full-aperture method for stray-light detection and diagnosis applied to a Cassegrain telescope illustrated from the side as in FIG. 1B.

By way of comparison with the invention described and claimed herein, FIG. 2 shows a prior art full aperture stray-light testing method as applied to a Cassegrain telescope 10 illustrated by FIG. 1A and FIG. 1B. In this case, full aperture illumination is shown from a single, off-axis location outside the field of view of the telescope and four different stray-light defects are shown. Ray 40 misses the aperture entirely. Ray 42 scatters first from a strut 18 as shown by dotted line 44 to inner baffle 26, where it is again scattered as shown by dotted line 46 to the detector 32. Ray 48 scatters off the inside of baffle 16 as shown by dotted line 50 to primary mirror 12, where it is then reflected to secondary mirror 14 as shown by dotted line 52, and thereafter to the detector 32 as shown by dotted line 54. Ray 56 strikes the interior wall of detector baffle 30 and is scattered to the detector as shown by dotted line 58, and ray 60 directly strikes the detector 32. It is to be recognized that all of the rays enter the aperture outside the periphery of the secondary mirror 14. Thus, it can be seen that with full aperture illumination there can be many instances of stray light striking the detector as a result of many corresponding stray light defects in the system, some of which result in multiple scattering, thereby making identification of those stray light defects difficult.

In contrast to the afore described prior art full-aperture stray light detection method, a central concept of the present invention is to use a subaperture, or "pencil," beam of light 61 to illuminate an optical system under test, such as a Cassegrain telescope, as shown in FIG. 3. The beam, centered about a propagation axis 62, is launched into the optical system such that its propagation axis passes through the system aperture at a selected lateral position 64 and at selected orthogonal angles 66 and 68 relative to the optical axis 34 of the optical system. The beam is generated so as to have a selected width, as shown by arrows 70, at a selected location along the propagation axis 34 of the beam, typically where the beam enters the system aperture 20. The beam is then scanned over the aperture of the system under test, by changing the relative position of the source and the system under test by any of a variety of conventional translation and angular adjustment mechanisms as will be understood by a person skilled in the art. Notwithstanding the example of a Cassegrain telescope shown in FIG. 3, it is to be understood that, as used with respect to the present invention, the term "aperture" does not necessarily refer just to the normal system entrance aperture, but includes all locations and directions of light relative to the sensor, or detection plane or surface (which may be non-planar), through which light might enter the system.

As can be seen in FIG. 3, when a pencil beam is used, rather than a full-aperture beam, the amount of stray light detected for a given beam position, set of direction angles, and width is restricted. For example, light may only scatter off the interior wall of detector baffle 30, as shown by ray 72 and dotted line 74. Since the width and propagation path of the pencil beam are known, it is easier to identify the location of a stray light defect, such as a scattering surface or a "leak" in or between the baffles of the optical system under test. Thence, the salient benefit of the invention is that scanning a pencil beam in both field angle and location within the aperture provides more specific information about the path which the stray light has followed, and this information can be used to more rapidly determine the cause of the stray light than full-aperture testing permits.

A preferred embodiment of a device 80 for stray-light detection and diagnosis according to the present invention is shown in FIG. 4. The device generally comprises a light source 82, light beam conditioning optics 84 for producing the desired test light beam, that is, a pencil beam of light, a detector 86 to be disposed at the detection plane of an optical system under test, and a motion system for selecting the position and angles at which the pencil beam enters the aperture of the optical system under test. It is to be understood that the detector 86 may be supplied with or as part of the optical system under test, or may be provided separately, without departing from the principles of the invention. Preferably two motion systems are provided, a first motion system 88 that controls the attitude and position of the light source and beam conditioning optics and a second motion system 90 that controls the attitude and position of the optical system under test 92. However, it is to be understood that ordinarily a single system that controls position and angle of attack of the pencil beam relative to the optical system under test will be adequate to perform the method of the invention. It will be readily understood by a person having skill in the art that the motion systems may be constructed from such commonly used mechanisms as, for example, optical translations stages and multi-axis mirror mounts under motorized control.

The device also preferably includes a data processor and electronic interface system 94, that is, a digital computer and associated input-output electronics, to control the light source 82, receive and, if necessary, condition signals from the detector as is well understood in the art, and to process those signals to correlate the detection of stray light with the relative position and attitude, and the width, of the test light beam so as to present data relating those parameters and metrics in a organized way to facilitate analysis. To that end, the system 94 is preferably connected to a visual display 96 for displaying data and a keyboard 98, or other input device, for entering data and instructions.

For low light conditions in particular, it is also preferable that the system include a light shield 100 surrounding all or a portion of the optical system under test 92 so as to minimize background light that could make light from the test light beam difficult to distinguish. In addition, a light modulator may be used, such as chopper 102, to distinguish test light from other light, as will be readily understood by those skilled in the art. The chopper, which may simply be an aperture 104 rotated by a motor 106, may be controlled or monitored by the data processor 94, so that the resulting signals produced by the detector 86 can be synchronously detected, thereby further increasing the ratio of test light signal strength to background signal strength.

Figure 5:
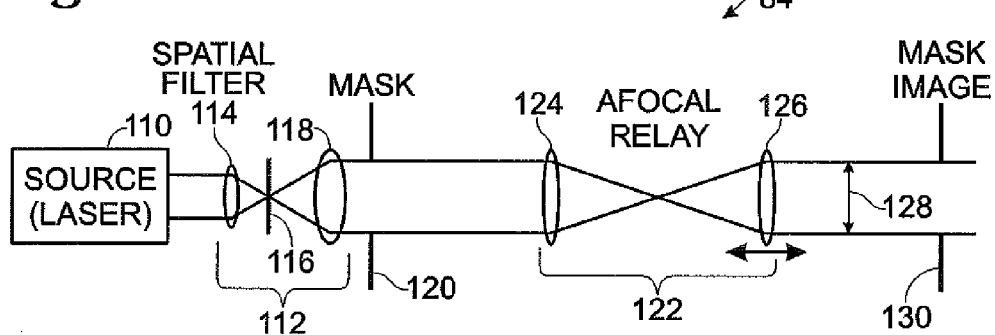
FIG. 5 is a schematic diagram of a light source and beam conditioning optics for a device for stray-light detection and diagnosis according to the present invention.

The size of the pencil test beam of light depends on a balance between the time required to identify the existence of a stray light problem, on the one hand, and the time required to analyze the test results to identify the cause of the problem. Preferably, the test system provides a beam that can be resized. FIG. 5 shows beam conditioning optics that not only may be used to shape the intensity profile of the test light beam, but vary its width as desired. The conditioning optics preferably include a laser light source 110, a spatial filter 112 comprising a first lens 114 that focuses the laser light to a point, a pinhole mask 116 located at that point, and a second lens 118 to collimate the light that passes through the pinhole mask. A second circular mask 120 may be provided to further shape the intensity profile of the beam, which is followed by an afocal relay 122, comprising a first lens 124 and a second lens 126 arranged so that the back focal point of the first lens is coincident with the front focal point of the second lens 126. To adjust the width of the beam the second lens 126 can, for example, be a complex lens system whose focal length may be varied so that by varying that focal length while positioning the lens so maintain an afocal relationship with the first lens 124, the output width 128 of the beam can be varied. An additional mask in the form of an adjustable aperture 130 may be provided at the output to control the beam intensity profile. It is to be understood that in the conditioning optics mirrors or other optical elements may be used instead of lenses to achieve some desired advantage, such as the reduction of scattering that can generally be achieved using mirrors.

Preferably, the system enables the beam to be resized during testing between two or more sizes. This allows the recursive application of the scanning operation to smaller areas leading to more refined knowledge of the system. The smallest practical size for a beam is limited by diffraction, which also depends on wavelength, and is more significant for longer wavelengths. Similarly the largest size beam that is practical to use is limited by the complexity of the optical system used to generate the beam and the required stray-light control in the test system. It is also possible to combine a full-aperture illumination system with a scanning pencil beam instrument, either in the same instrument or as part of the same facility to optimize the amount of time used for stray light detection as compared to diagnosis.

A system designed to move the source over the aperture of a sensor system, without disassembling the sensor system, could be built in a compact form. One particular way to do this is to mount a mirror over the entrance aperture of the system under test. The pencil beam would be scanned over the mirror at angles and a position to probe the system under test over the desired set of directions and aperture locations. Mounting a mirror over the sensor and stage to the side of the system results in the minimum amount of hardware mounted directly over the system under test. The mirror mounted over a sensor in a field test system may be curved, rather than flat, to allow adequate motion of the beam in directions and location relative to the system under test. In the case of a curved mirror, adaptive optics may be useful to compensate for aberrations in the test beam produced by reflecting from the mirror in order to have good control of beam shape, direction and location in the system under test. The scanning pencil beam approach can also be used with a camera system, such as an integrated dewar assembly, separate from a telescope. This allows the testing of baffles and cold shields.

As a predicate to use of the stray light detection device and method, an analysis of what stray light should be expected would ordinarily be carried out. While this may be done in a variety of ways, preferably one of several commercially-available stray light analysis computer programs is used, though a custom program may be prepared or a manual analysis may be carried out without departing from the principles of the invention. One such program is known as FRED and is available from Photon Engineering, LLC of Tucson, Ariz. Another such program is known as ASAP and is available from Breault Research Organization, also located in Tucson, Ariz.

Figure 6B:
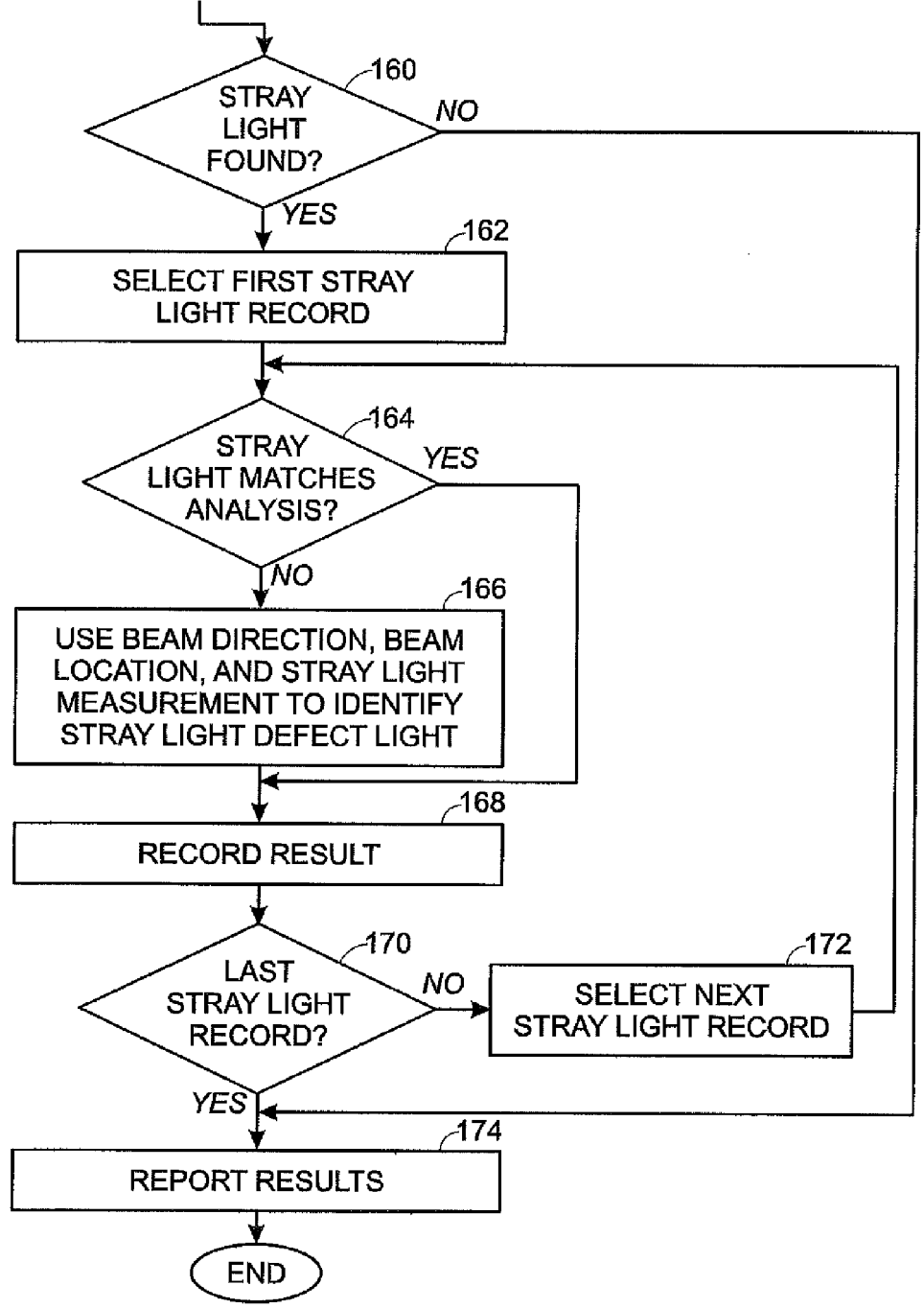
FIG. 6B is the second part of the flow chart of FIG. 6A.

The operation of a stray light testing device according to the present invention is preferably carried out by the data processing system 94 programmed to carry out the steps shown in the flow chart of FIG. 6A and FIG. 6B. Thus, once started, at step 140 the beam angle and position scan parameters are specified, either be manual input or automatically. The system is then initialized at step 142 so as to set the starting points. At step 144 the pencil beam is moved to its initial angle and position. At step 146 the distribution of light in the detection, or image, plane is measured. At step 148 the processor examines the detector output to determine whether stray light is present, based on the expected output of the detector given the beam position, angle and width and a structural and optical model of the optical system under test. If stray light is detected, the beam position and direction, and the measured light distribution, are recorded at step 150. Regardless, at step 152 a determination is made as to whether all beam positions have been scanned. If not, the beam is moved to the next position in step 154. Otherwise, a determination is made in step 156 as to whether all beam angles have been scanned for a given position. If not, step 158 moves the beam to the next angle and position.

If at step 160 it is determined that stray light has been found, then a first stray light record is selected at step 162 and compared, at step 164, to a separate stray light expectation analysis as described above. If the detected stray light does not match the analysis, then at step 166 beam direction, beam location and stray light measurement data are analyzed with the assistance of human evaluation to identify the stray light defect. It is anticipated that a computer algorithm can be designed to do this automatically as well. Thereafter, at step 168, the result of the selected stray light record is recorded. If the stray light record is not the last stray light record, as determined at step 170, the next stray light record is selected at step 172 and steps 162 through 170 are repeated. On the other hand, if the last stray light record has been analyzed, or no stray light was found in step 160, then the results are reported at step 172 and the process is complete.

Diagnosis of the cause of stray light in step 166 requires the specific system defect to be identified. The defect will be located at a particular place along a particular light path. In some cases there may be only one possible location along a light path that could be the cause of stray light, in which case detection of stray light for a particular source direction and location will both detect and diagnose the cause of stray light. It is also possible that there may be more than one potential source of stray light for a given source direction and location. In this case a defect analysis of the system via simulation will support a specific diagnosis.

Generally, a particular defect may be diagnosed more rapidly using additional information that the scanning pencil beam can provide in comparison to the prior art full-aperture approach. For example, a single defect in the system may cause stray-light from more than one source direction and location. In the case of stray-light being detected for two settings of the test beam of light, each setting has a set of associated light paths, and each light path in the set has a specific defect location. The two sets of paths can be evaluated physically for a common defect location. If there is one defect location in common to the two sets of ray paths, it is the likely defect location for both ray paths; however, the possibility of two defects being present cannot in general be ignored.

Figure 7:
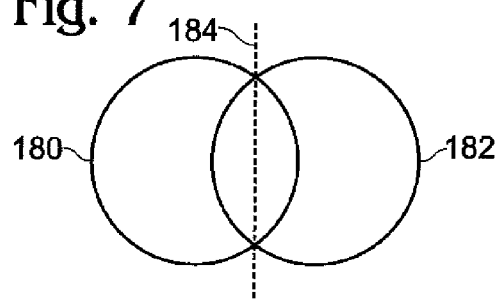
FIG. 7 is an illustration of the use of test beam of light overlap for stray-light detection and diagnosis according to the present invention.

In particular, the overlap of the beam footprints for two consecutive beam scan positions, as shown in FIG. 7, can be used to narrow down the possible locations of a stray-light causing optical system defect. The test beam footprint on the optical system under test will be scanned in steps, both in position and angle. The beam footprint shape and amount of overlap can be selected during operation. Assuming a nominally uniform irradiance distribution in the beam footprint and overlapping beam positions, then if stray light is detected, the analysis can make use of the additional information provided by the overlapping beam footprints. For example, if stray light is detected when the beam is in position 180 in FIG. 7, but not in position 182, then the analysis need only consider light within the appropriate subset corresponding to position 180. Similarly if the stray light is detected when the beam is in both positions 180 and 182, then only the paths corresponding to the intersection 184 of the two beam footprints need to be considered.

Figure 8:
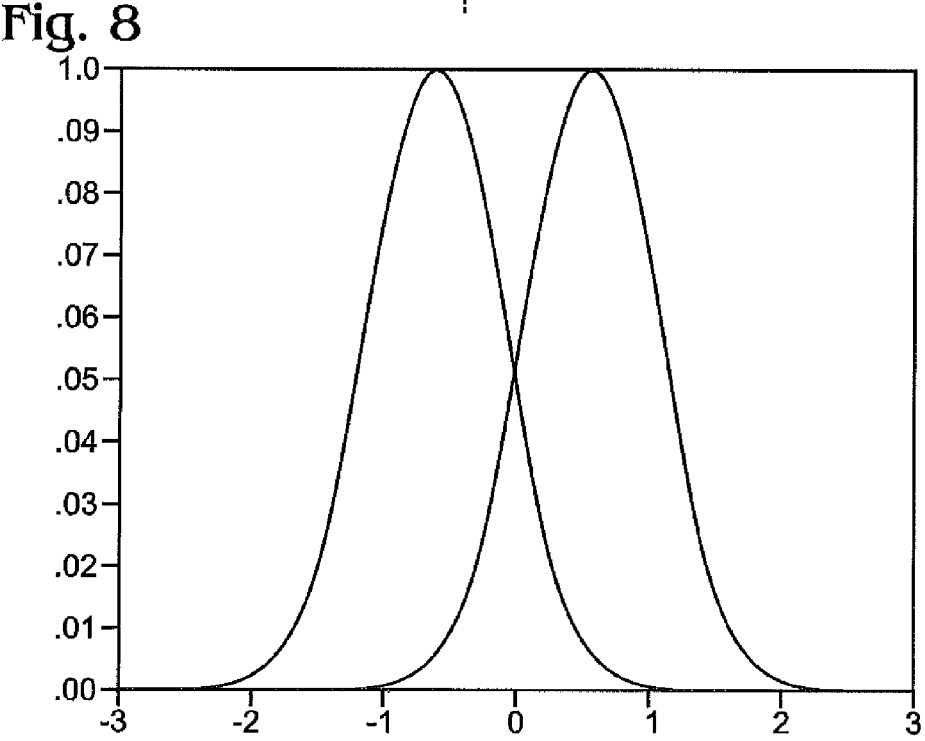
FIG. 8 is an illustration of the use of test beam of light overlap for stray-light detection and diagnosis according to the present invention where the beam intensity profile is Gaussian.

The beam footprint need not have uniform illumination. Rather, a varying beam profile can be used to encode position within the beam footprint, and it is preferred to use a Gaussian beam profile, which occurs naturally with most laser sources. If a Gaussian beam profile is used, then it is possible to use the ratio of a stray light signal power between overlapping beam footprints to precisely locate the position of a ray in the aperture causing stray light. For example, if in FIG. 7 the beam has a Gaussian profile and a stray light defect is present for both positions 180 and 182 with equal power, as shown in FIG. 8, then the stray light defect is on a ray path that must go through the bisector 184. More generally, the ratio between a stray light signals found in adjacent beam positions can be used to constrain the ray path causing stray light, thereby reducing the time to diagnose the specific defect. Data from additional overlapping measurements may be used to further refine the location of a stray light defect.

Another approach to further refining the diagnosis of a particular defect causing stray-light is to use image information to narrow the possible causes of stray-light, possibly to the specific source. Different defects will produce stray-light having different patterns or characteristic images. It is possible to associate a stray-light image pattern with a particular system defect that causes the stray light, for example, through the use of principal component analysis. Images associated with particular system defects that cause stray light may be stored in a data base in the data processor 94 of FIG. 4. In Step 166 of FIG. 6B a portion or set of the data gathered by the detector 86 may be compared by the processor 94 to images in the data base of images to identify the presence of a particular system defect that causes the stray light.

An alternative embodiment of a portion of device 190 for stray light detection and diagnosis according to the present invention is shown in FIG. 9. This embodiment is particularly adapted to operate with very low background light. A vacuum chamber 192 is provided to keep the system clean, to eliminate atmospheric scattering, and to enable the use of a cryogenic shield 194 to reduce background light so as to be able to use a long-wave infrared sensor. In this case a motion system 196 moves the sensor with respect to the light source and the optical system under test 92. Multiple wavelengths provided by lasers 198, 200 and 202 are used for testing the optical system, the selected laser beam 204 passing into the vacuum chamber 192 through window 206.

This embodiment particularly takes advantage of the fact that the subaperture scanning, pencil beam method requires less optical power to illuminate the optical system under test to make the stray light easily detectable. As a result, a broader range of sources may be considered for use in stray-light testing, including wavelengths that might not otherwise be easily tested using a full aperture a method. For example, there currently are very few long wave infrared (LWIR) lasers; however, recently developed quantum cascade lasers are available at a variety of wavelengths in the LWIR with sufficient power to illuminate a subaperture to test the stray light performance of a system, but not necessarily enough power to illuminate the full aperture adequately. In addition, the reduced source power requirements of subaperture testing may even allow the use of non-laser sources. Multiple wavelengths can be used in the system to support testing of multiple wavelength band systems. The multiple wavelengths may be used one at a time or simultaneously.

In the embodiments disclosed above, the system to be tested is looking at the light shield 100 in FIG. 4 or the cryogenic shield 194 in FIG. 9. The system may be an optical device, such as the exemplary Cassegrain telescope, with or without a detector. If the optical system being tested does not include a detector, then a surrogate detector would ordinarily be provided.

The light shield serves to minimize background light, but can also reflect stray light back into the system under test. The cryogenic light shield is used when an infrared imaging system sensitive to thermal emission of objects in the field-of-view is being tested. The purpose of both shields is to provide a dark background at the wavelengths to which the system under test is responsive by blocking ambient light and absorbing light at those wavelengths. At visible wavelengths the shield should not only block ambient light but should preferably appear black to the human eye. At infrared wavelengths, a dark background may require a cold background so that the shield itself is not a significant emitter of light, and if an infrared light source is present, an infrared absorbing material is required. Something that is black at infrared wavelengths may not necessarily appear black to a person. At visible wavelengths, a black background need not be cold.

The embodiment of the stray light test instrument represented by FIGS. 10-13 includes a single-stage light-trap 204 to provide a dark background for the optical system under test 206 and a test beam delivery system 208 that complements the light trap so as not to detract therefrom. As is understood by persons skilled in the art, a commonly-known single-stage light-trap is comprised of two planar surfaces 210 and 212 oriented at an acute angle to one another. Surface 210 is typically disposed at 45 degrees to the axis of the test beam, has a smooth, mirror like characteristic, sometimes referred to as a specular surface, and is also absorptive at the relevant wavelengths. Sometimes this specular black surface is also referred to as a "black mirror." For use at visible wavelengths surface 210 may comprise, for example, a sheet of black acrylic, and the surface need not be cooled. Surface 212, on the other hand, has a diffuse characteristic, but is also absorptive at the relevant wavelengths and is referred to herein as a diffuse black surface. A sheet of roughened black acrylic may be used, for example, in this case. The diffuse black surface is typically disposed at 45 degrees to the specular black surface so as to be nominally parallel to the direction of the test beam.

Neither the diffuse black surface nor the specular black surface needs to be cooled for use when testing at visible wavelengths. However, if thermal emission of light from these surfaces must be reduced, the specular black surface and diffuse black surface may each be one side of respective aluminum tanks 214 and 216 filled with liquid nitrogen so as to provide a cold, dark background. Alternatively, the tanks may be filled with some other cold liquid or gas, or the specular and diffuse surfaces may be cooled by other means, as such as by a cryogenic pump.

The test beam 218, which typically is smaller in diameter than the aperture 220 of the optical system to be tested, must be directed at the aperture of that optical system. That means that the beam must be guided to a position between the light trap 204 and the aperture 220. In the present invention, that is accomplished by a light beam source and the beam delivery system 208.

The beam delivery system, or "stalk," 208 guides the test beam from the output of beam conditioner optics 84 to a position between the light trap and the aperture of the system to be tested, and directs the test beam toward that aperture. The delivery system is preferably comprised of a number of small, flat mirrors 222, 224, 226, 228 and 229 and, preferably, two linear stages 230 and 232. A light source 110 is preferably spatially filtered and collimated by the beam conditioner optics to produce a test beam 218, which is aligned to the first of the series of mirrors 222-229 in the beam delivery system. Referring to the embodiment shown in FIGS. 11 and 12, the test beam follows path 234 from the beam conditioning optics 84 to first mirror 222; from mirror 222 along path 236 to mirror 224; from mirror 224 along path 237 into the top 238 of the beam delivery stalk 208 to mirror 226 in the stalk; from mirror 226 laterally along path 240 within the top of the stalk to mirror 228 within the stalk; and from mirror 228 downwardly along path 242 within the stalk to mirror 229 within the stalk, which directs the beam out of the stalk through a small hole 244 toward the aperture 220 of the system to be tested 206. In this embodiment, and preferably generally, the bottom of the stalk 246 and hole 244 are disposed between the light trap and the system to be tested so as to direct the beam toward the aperture of that system.

Figure 10:
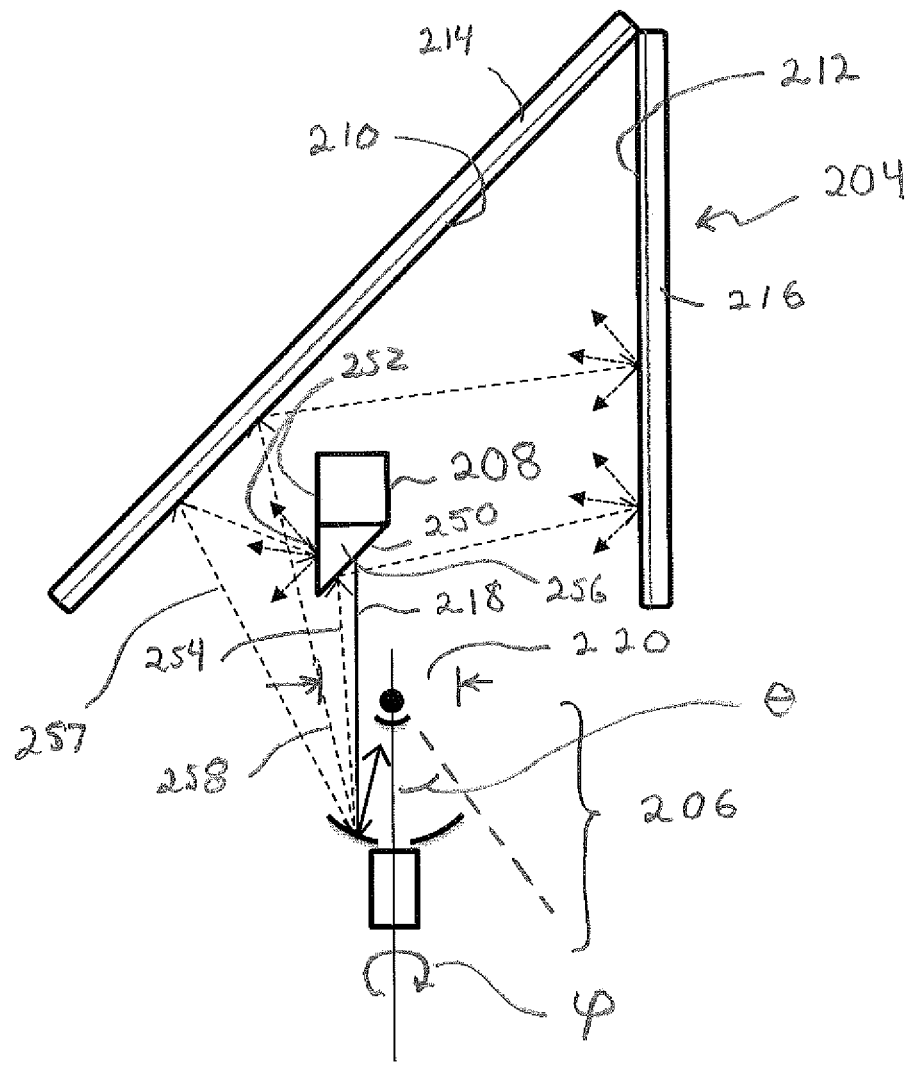
FIG. 10 is a schematic of a lateral section of a single stage light trap according to another embodiment of the present invention disposed in relationship to a Cassegrain telescope as an example of an optical system to be tested for stray light.
Figure 11:
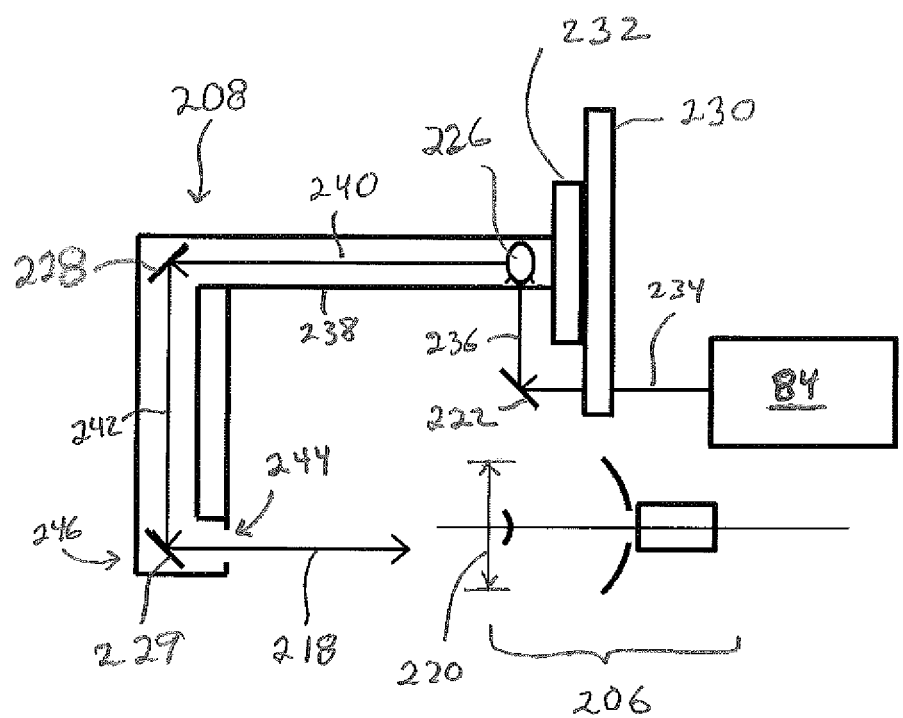
FIG. 11 is a schematic of a vertical section of the light trap of FIG. 10.
Figure 12:
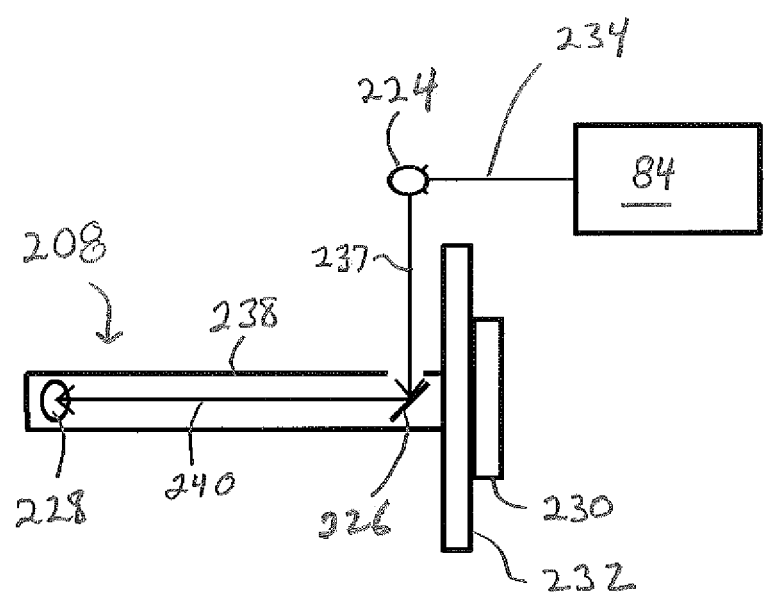
FIG. 12 is a schematic top view of a light beam source and beam stalk portion of the light trap and telescope of FIG. 10, together with positioners for the beam stalk and system to be tested for stray light.

Preferably, in the embodiment shown in FIGS. 10-12, the beam delivery stalk is moved vertically and horizontally across the aperture of the system to be tested by respective linear stages 230 and 232 to translate the hole 244, which corresponds to the position of a sub-aperture beam. Polar and azimuthal directions are then selected. However, it is desirable not to move the light trap. Therefore the telescope is scanned in azimuth by rotation about its optical axis, and in field angle by rotation of the telescope about an axis nominally normal to the beam direction and nominally parallel to the surfaces of the light trap.

Figure 13:
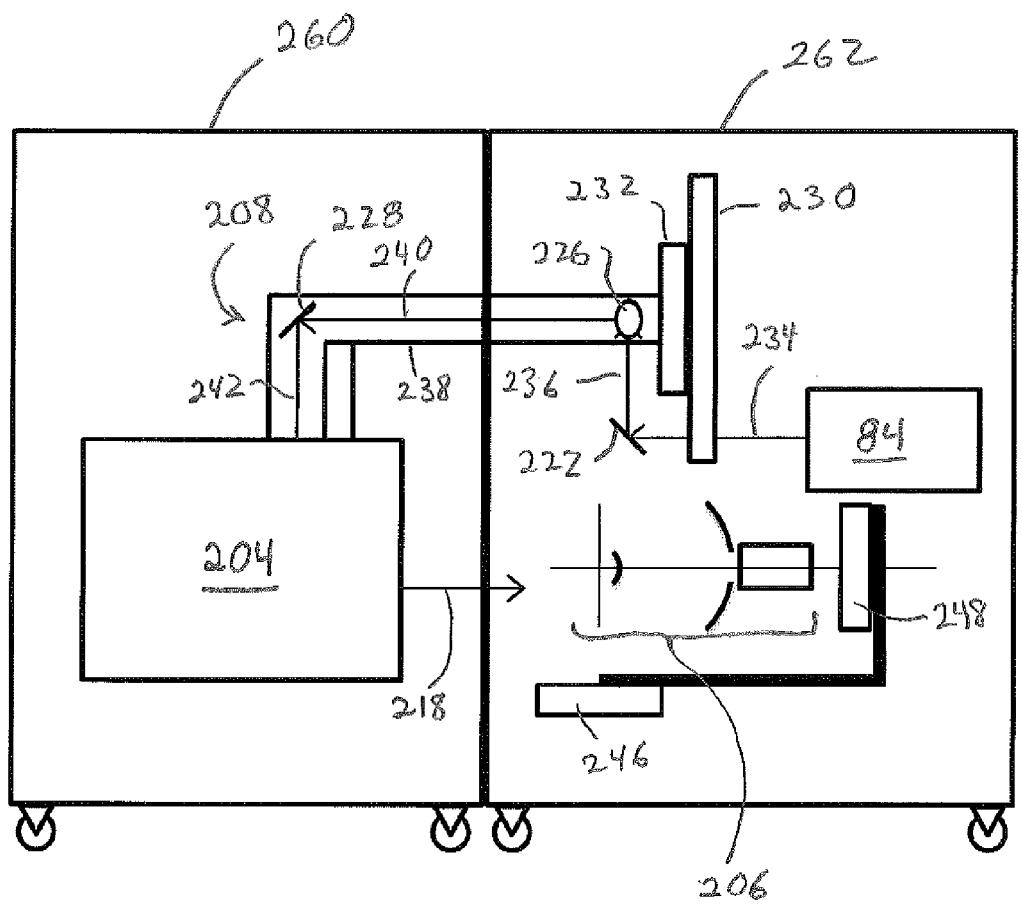
FIG. 13 is a schematic of a stray light testing system including a light trap and complementary test beam delivery system disposed in a two-part housing that is closed.
Figure 14:
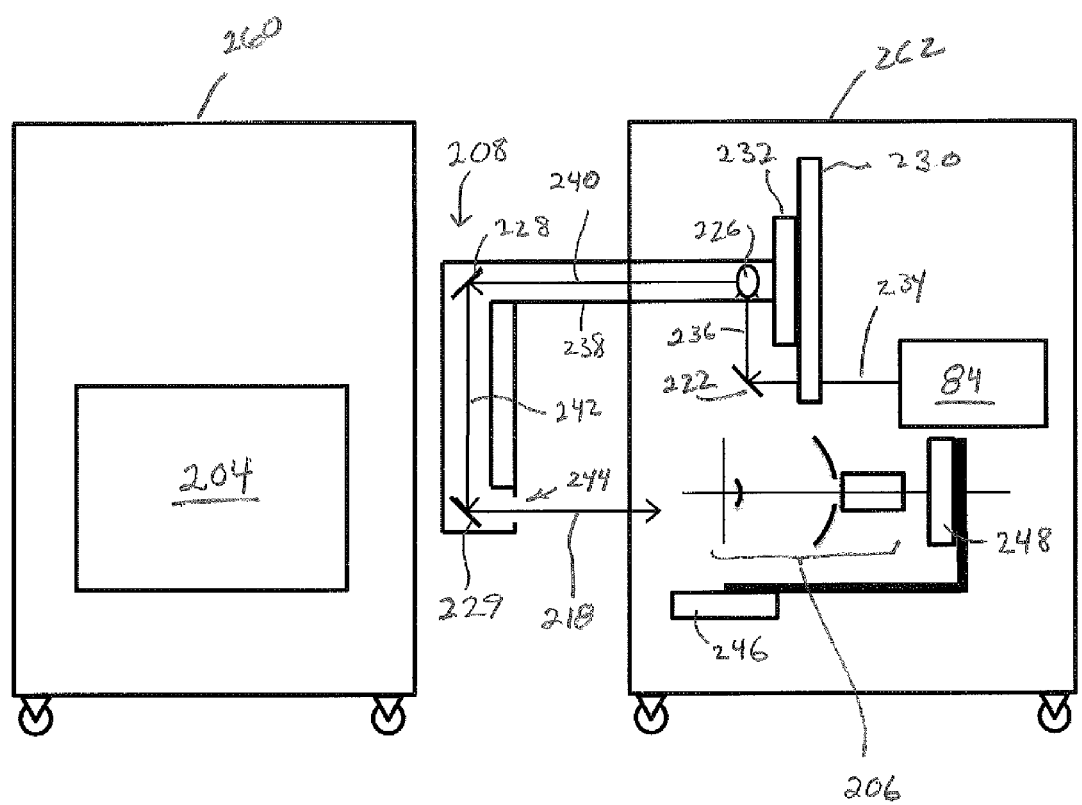
FIG. 14 is the schematic of the testing system of FIG. 13 with the two-part housing open.

Angular scanning θ, corresponding to the polar angle of a spherical coordinate system, and angular scanning φ, corresponding to the azimuthal angle of a spherical coordinate system are accomplished in two steps, employing a vertical axis rotational stage 246 and horizontal axis rotational stage 248 on which the system to be tested is mounted, as shown in FIGS. 13 and 14. First, for a given angle φ the vertical axis rotational stage 246 scans through a selected range of angles θ. Then angle φ is selectively changed using the horizontal axis rotational stage 248 and the angular scanning θ is repeated, until all the desired angular scanning from all the desired origins is completed. It is necessary to scan the telescope field angle such that it looks directly only at the specular surface 210. A telescope may be tested at field angles up to, for example, 20 degrees from the optical axis and any azimuth angle (0 degrees to 360 degrees) in a fairly small instrument.

Preferably, the two linear stages 220 and 232 are stacked such that the beam delivery stalk is attached to the horizontal linear stage, which in turn rides on the vertical linear stage. This arrangement of stages minimizes the mass on the horizontal stage making it the most appropriate in general to be used as the fast aperture scan axis, while the vertical axis is used as the slower aperture scan axis. Notwithstanding the foregoing, it is to be understood that other translational and angular scanning stages and processes may be suitable without departing from the principles of the invention.

An important feature of the embodiments of the invention including the light trap is that the beam delivery stalk 208 is configured so that one of its surfaces 250 is specular and parallel to the specular surface 210 of the light trap, and a second surface 252 of the stalk is diffuse and parallel to the diffuse surface 212 of the light-trap. All surfaces of the stalk except the specular surface 250 preferable should be diffuse and absorptive. The specular surface 250 of the stalk works with the diffuse surface 212 of the light-trap, and the diffuse surface 252 of the stalk works with specular surface 210 of the light-trap, as shown in FIG. 10, so as to maintain the functionality of a single-stage light trap. That is, for examples, stray light 254 emitted from the aperture of the system under test that strikes the specular, hypotenuse surface 250 of the triangular portion 256 of the stalk will be reflected toward the diffuse surface 212 of the light trap, and stray light 257, 258 from the aperture of the system under test that strikes the specular surface 210 of the light trap will be reflected either to the diffuse surface 212 of the light trap or to the diffuse surface 252 of the of the stalk. This ensures that, despite the presence of the beam delivery stalk between the light trap and the aperture of the system to be tested, stray light reflected or scattered from that system aperture will encounter a single stage light trap. When used in the infrared, the triangular portion of the beam delivery stalk may be filled with liquid nitrogen, or otherwise cooled, so as to provide a cold, dark background.

A light-trap with more than a single specular surface may be used to form a two or more stage light trap in place of a single-stage light trap without departing from the principles of the invention. However, the benefits of additional stages depend on the performance of the small mirrors in the beam deliver system, as scattering from those mirrors limits the stray light performance of the instrument. Such scattering may be reduced by cleaning those mirrors with, for example a $CO_2$ snow machine, or other non-damaging method. When cleaning is inadequate to reach the desired instrument stray light signature, the mirrors may be replaced.

Stray light performance of the instrument can be improved by increasing the distance of the telescope from the light trap. However, either the maximum field angle that can be tested must be reduced, or the light trap size increased.

Although the specular surface 210 is nominally disposed at 45 degrees to the test beam 218, this is not necessarily the optimum value. Since the test instrument scans only one side of the normal direction, the optimal angle of the light trap specular surface may be different than 45 degrees from the diffuse surface. In particular, the polar rotation θ is preferably only in one direction, as shown in FIG. 10, so by making the angle between the specular surface 210 and the diffuse surface somewhat less than 45 degrees the field of view of the system under test can be centered on the diffuse surface 216 as seen in reflection from the specular surface 210, thereby minimizing the size of the diffuse surface. For a scan from 0-20 degrees field angle, the midrange value is 10 degrees. If the telescope is looking at 10 degrees off-axis, then a 40 degree tilt of the specular surface would cause the system under test to view the diffuse surface normally in reflection from the specular surface, which would reduce the maximum angle of incidence on the diffuse surface.

If a cryogenic background is used, the instrument must support either a dry atmosphere or a vacuum to prevent the formation of ice (frozen water).

As shown in FIGS. 13 and 14, the instrument according to this embodiment preferably comprises two parts that can be easily separated so as to facilitate cleaning of the light trap and beam delivery optics. One part 260 may contain the light trap 204 and the other part 262 may contain the rest of the instrument. FIG. 13 shows the two parts joined together. Preferably, when joined together the interior will support a dry nitrogen atmosphere or a vacuum. FIG. 14 shows the two parts separated from one another.

The terms and expressions that have been employed in the foregoing specification are used therein as terms of description and not of limitation, and there is no intention, in the uses of such terms and expressions, to exclude equivalents of the features shown and described or portions thereof, it being recognized that the scope of the invention is defined and limited only by the claims which follow.

What is claimed is:

1. A device for identifying sources of stray light in an optical system to be tested having an aperture through which light may enter the system and a detection surface, comprising:
    a source of a test light beam having a propagation axis and a selected width at a selected location along the propagation axis of the test light beam, including a test light beam width magnifier whereby the cross sectional area of the test light beam may be made less than the cross sectional area of the aperture of the optical system to be tested;
    a relative lateral, positioning stage;
    an angular test light beam directing stage, the lateral test light beam positioning stage and the angular test light beam directing stage being adapted to launch the test light beam into the aperture at a selected position and selected directional angles with respect to a selected optical axis;
    a detector adapted to be located at the detection surface;
    a data processing system responsive to the detector for identifying stray light that reaches the detector and producing a data set relating the presence of stray light at the detector to the location and direction angles of the test light beam at the aperture;
    a light trap disposed in the field of view of the optical system, wherein the light trap comprises a specular surface disposed at an acute angle to the axis of the test light beam and a diffuse surface disposed nominally parallel to the axis of the test light beam; and
    a light beam delivery system including a diffuse surface disposed to interact with the specular surface of the light trap and a specular surface disposed to interact with the diffuse surface of the light trap, the test light beam being delivered to the optical system through a window in the specular surface of the light beam delivery system.

2. The device of claim 1, further comprising a vertical linear stage for positioning the beam delivery system vertically with respect to the optical system to be tested, a horizontal linear stage for positioning the beam delivery system horizontally with respect to the optical system to be tested, a first rotational stage for positioning the polar angle optical system to be tested with respect to the test beam delivery system and a second rotational stage for positioning azimuthal angle of the optical system with respect to the test beam delivery system.

3. The device of claim 1, wherein the beam delivery system is mounted on a horizontal linear stage and the horizontal stage is mounted on a vertical linear stage.

4. The device of claim 1, wherein the acute angle is nominally forty-five degrees.

5. The device of claim 1, wherein the specular and diffuse surfaces of the light trap comprise acrylic sheets.

6. The device of claim 1, wherein the specular and diffuse surfaces of the light trap are cryogenically cooled.

7. The device of claim 6, wherein a portion of the test beam delivery system is cryogenically cooled.

8. The device of claim 1, further comprising a housing for the device in which a nitrogen purged atmosphere may be maintained.

9. The device of claim 1, wherein the acute angle is selected to ensure that the field of view of the optical system to be tested is centered on the diffuse surface as seen in reflection from the specular surface.

10. A light trap and test light beam delivery system for identifying actual sources of stray light in and optical system having an aperture through which light may enter the system, comprising:
   a light beam delivery system for placement between the light trap and the optical system; and
   a light trap having a specular surface disposed at an acute angle to the axis of the test light beam and a diffuse surface disposed nominally parallel to the axis of the test light beam;
   the light beam delivery system including a diffuse surface disposed to interact with the specular surface of the light trap and a specular surface disposed to interact with the diffuse surface of the light beam delivery system, the test light beam being delivered to the optical system through a window in the specular surface of the light beam delivery system.

11. The system of claim 10, comprising a first part housing the light trap and a second, complementary part housing liner positioning stages supporting the beam delivery system and rotational states for supporting the optical system such that they may be joined together for identifying sources of stray light in the optical system.

12. The system of claim 11, wherein when the first part and the second part are joined together, they form a housing that will support a dry nitrogen atmosphere therein.

13. The system of claim 11, wherein when the first part and the second part are joined together, they form a housing that will support a vacuum therein.

* * * * *